(12) United States Patent
Lee et al.

(10) Patent No.: US 8,743,817 B2
(45) Date of Patent: Jun. 3, 2014

(54) METHOD AND APPARATUS FOR CONTROLLING TRANSMIT POWER

(75) Inventors: Sang Wook Lee, Anyang-si (KR); Man Young Jung, Anyang-si (KR); Su Hwan Lim, Anyang-si (KR); Yoon Oh Yang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 26 days.

(21) Appl. No.: 13/521,934

(22) PCT Filed: Nov. 24, 2010

(86) PCT No.: PCT/KR2010/008333
§ 371 (c)(1),
(2), (4) Date: Jul. 12, 2012

(87) PCT Pub. No.: WO2011/122754
PCT Pub. Date: Oct. 6, 2011

(65) Prior Publication Data
US 2013/0039289 A1    Feb. 14, 2013

Related U.S. Application Data

(60) Provisional application No. 61/319,884, filed on Apr. 1, 2010.

(30) Foreign Application Priority Data

Aug. 18, 2010  (KR) .......................... 10-2010-0079761

(51) Int. Cl.
*H04W 4/00* (2009.01)
(52) U.S. Cl.
USPC .......................................... 370/329; 370/465

(58) Field of Classification Search
USPC .............. 370/229–230.1, 252, 311, 328–330, 370/338, 464, 465, 468
See application file for complete search history.

(56) References Cited

U.S. PATENT DOCUMENTS

| | | | |
|---|---|---|---|
| 6,430,394 B1 * | 8/2002 | Boyden | 455/13.4 |
| 8,121,174 B2 * | 2/2012 | Myers et al. | 375/141 |
| 2006/0045046 A1 * | 3/2006 | Kim et al. | 370/329 |
| 2008/0141051 A1 | 6/2008 | Lee et al. | |
| 2011/0085513 A1 * | 4/2011 | Chen et al. | 370/330 |
| 2013/0012255 A1 * | 1/2013 | Kim et al. | 455/522 |

FOREIGN PATENT DOCUMENTS

| | | |
|---|---|---|
| KR | 2002-0007799 A | 1/2002 |
| KR | 10-2006-0014288 A | 2/2006 |
| KR | 10-0943621 B1 | 2/2010 |

* cited by examiner

*Primary Examiner* — Kerri Rose
(74) *Attorney, Agent, or Firm* — Birch, Stewart, Kolasch & Birch, LLP

(57) ABSTRACT

A radio communication system is disclosed. The method for transmitting a signal by a user equipment in a radio communication system includes generating a plurality of uplink signals, reducing maximum transmit power of the user equipment in consideration of a signal configuration for the plurality of uplink signals, and transmitting the plurality of uplink signals to a network within the range of the reduced maximum transmit power of the user equipment.

4 Claims, 8 Drawing Sheets

Fig. 2
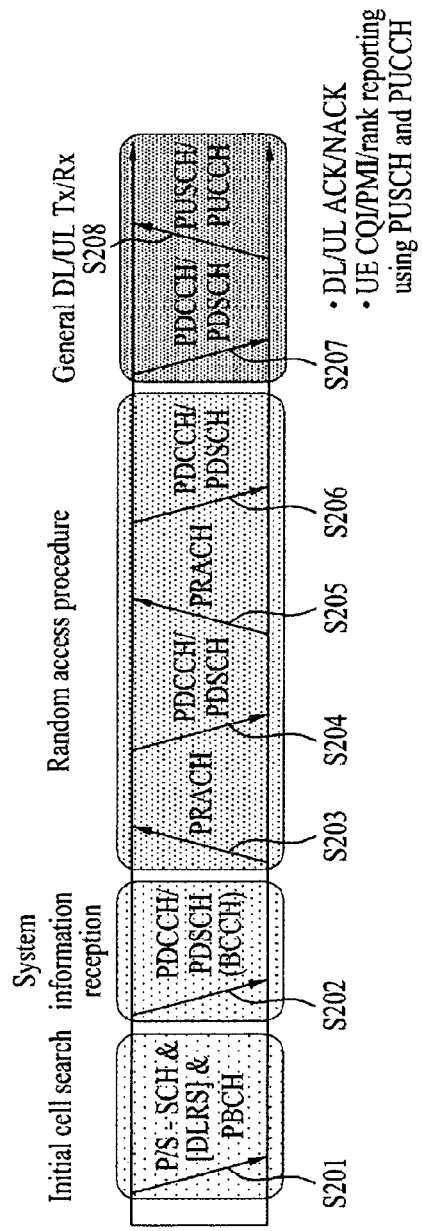
[Fig. 3]
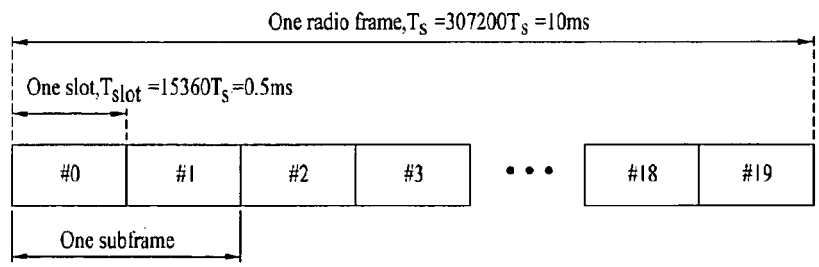

Fig. 9

| Modulation | freq. dist. | RB allocation pattern ||||  Intraband CA ||||
|---|---|---|---|---|---|---|---|---|---|
| | | 1.4MHz | 3MHz | ... | 20MHz | 1.4MHz | 3MHz | ... | 40MHz |
| QPSK | 0 | X | X | ... | X | TBD | TBD | ... | TBD |
| | 1 | TBD | TBD | ... | TBD | TBD | TBD | ... | TBD |
| | 2 | TBD | TBD | ... | TBD | TBD | TBD | ... | TBD |
| | ... | ... | ... | ... | ... | ... | ... | ... | ... |
| | N_f | TBD | TBD | ... | TBD | TBD | TBD | ... | TBD |
| 16QAM | 0 | X | X | ... | X | TBD | TBD | ... | TBD |
| | 1 | TBD | TBD | ... | TBD | TBD | TBD | ... | TBD |
| | 2 | TBD | TBD | ... | TBD | TBD | TBD | ... | TBD |
| | ... | ... | ... | ... | ... | ... | ... | ... | ... |
| | N_f | TBD | TBD | ... | TBD | TBD | TBD | ... | TBD |
| 64QAM | 1 | TBD | TBD | ... | TBD | TBD | TBD | ... | TBD |
| | 2 | TBD | TBD | ... | TBD | TBD | TBD | ... | TBD |
| | ... | ... | ... | ... | ... | ... | ... | ... | ... |
| | N_f | TBD | TBD | ... | TBD | TBD | TBD | ... | TBD | freq. dist.: frequency distance in unit of RB
X: a value compatible with LTE
TBD: to be determined

| | Region A | | | | | Region B | | | | | Region C | | | | |
|---|---|---|---|---|---|---|---|---|---|---|---|---|---|---|---|
| RB_start | 0 - A | | | | | B1 - B2 | | | | | C1 - 49 | | | | |
| L_CRB | range_A1 | | | range_A2 | | range_B1 | | | range_B2 | | range_C1 | | | range_C2 | |
| f_dist | 0 | 1 | ... | N_f | | 0 | 1 | ... | N_f | | | 1 | ... | N_f | |
| A-MPR | X | TBD | TBD | TBD | TBD | X | TBD | TBD | TBD | TBD | X | TBD | TBD | TBD | TBD |

RB_start: the lowest RB index of transmitted resource blocks
L_CRB: length of a contiguous resource block allocation
f_dist: frequecy distance in unit of RB
X: a value compatible with LTE

METHOD AND APPARATUS FOR CONTROLLING TRANSMIT POWER

CROSS REFERENCE TO RELATED APPLICATIONS

This application is the National Phase of PCT/KR2010/008333 filed on Nov. 24, 2010, which claims priority under 35 U.S.C. 119(e) to U.S. Provisional Application No. 61/319,884 filed on Apr. 1, 2010 and under 35 U.S.C. 119(a) to Patent Application No. 10-2010-0079761 filed in Republic of Korea on Aug. 18, 2010, all of which are hereby expressly incorporated by reference into the present application.

TECHNICAL FIELD

The present invention relates to a radio communication system, and more particularly, to a method and apparatus for controlling uplink transmit power.

BACKGROUND ART

Radio communication systems have been diversified in order to provide various types of communication services such as voice or data service. In general, a radio communication system is a multiple access system capable of sharing available system resources (bandwidth, transmit power or the like) so as to support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi Carrier Frequency Division Multiple Access (MC-FDMA) system and the like.

DISCLOSURE OF INVENTION

Technical Problem

An object of the present invention devised to solve the problem lies on a method and apparatus for efficiently controlling transmit power when a plurality of signals is transmitted in a radio communication system.

Another object of the present invention devised to solve the problem lies on a method and apparatus for efficiently controlling transmit power in consideration of a back-off value of a Power Amplifier (PA).

Solution to Problem

The object of the present invention can be achieved by providing a method for transmitting a signal by a user equipment in a radio communication system, the method including: generating a plurality of uplink signals; reducing maximum transmit power of the user equipment in consideration of a signal configuration for the plurality of uplink signals; and transmitting the plurality of uplink signals to a network within the range of the reduced maximum transmit power of the user equipment.

In another aspect of the present invention, provided herein is user equipment used in a radio communication system, including: a Radio Frequency (RF) unit configured to transmit or receive an RF signal to or from a base station; and a processor connected to the RF signal and configured to control the RF unit, wherein the processor generates a plurality of uplink signals, reduces maximum transmit power of the user equipment in consideration of a signal configuration for the plurality of uplink signals, and transmits the plurality of uplink signals to a network within the range of the reduced maximum transmit power of the user equipment.

The signal configuration may include a frequency distance between the plurality of uplink signals. In this case, the plurality of uplink signals may include a plurality of Physical Uplink Control Channel (PUCCH) signals, a plurality of Physical Uplink Shared Channel (PUSCH) signals or a combination of PUCCH signals and PUSCH signals.

The plurality of uplink signals may include PUSCH signals transmitted through a plurality of clusters.

If the plurality of uplink signals includes two PUCCH signals, a frequency distance between the PUCCH signals may be virtually fixed to $N_{RB}-2$ in the process of reducing the maximum transmit power of the user equipment, and $N_{RB}$ may be the total number of Resource Blocks (RBs) within a band.

The reduction of the maximum transmit power of the user equipment may be performed using Maximum Power Reduction (MPR) or Additional MPR (A-MPR) modified in consideration of the distance between the frequencies.

Advantageous Effects of Invention

According to the embodiments of the present invention, it is possible to efficiently control transmit power when a plurality of signals is transmitted in a radio communication system. In addition, it is possible to efficiently control transmit power in consideration of a back-off value of a Power Amplifier (PA).

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 2 is a diagram showing physical channels used in a Long Term Evolution (LTE) system and a general signal transmission method using the same.

FIG. 3 is a diagram showing the structure of a radio frame used in the LTE system.

FIG. 9 is a diagram showing a Maximum Power Reduction (MPR) table and a method of controlling the maximum transmit power of a UE using the same, according to an embodiment of the present invention.

MODE FOR THE INVENTION

The configuration, the operation and the other features of the embodiments of the present invention will be described with reference to the accompanying drawings. The following embodiments of the present invention may be utilized in various radio access systems such as a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, or a Multi Carrier Frequency Division Multiple Access (MC-FDMA) system. The CDMA system may be implemented as radio technology such as Universal Terrestrial Radio Access (UTRA) or CDMA2000. The TDMA system may be implemented as radio technology such as Global System for Mobile communications (GSM)/General Packet Radio Service (GPRS)/Enhanced Data Rates for GSM Evolution (EDGE). The OFDMA system may be implemented as radio technology such as IEEE 802.11 (Wi-Fi), IEEE 802.16 (WiMAX), IEEE 802-20 or E-UTRA (Evolved UTRA). The UTRA system is part of the Universal Mobile Telecommunications System (UMTS). A 3rd Generation Partnership Project Long Term Evolution (3GPP LTE) communication system is part of the E-UMTS (Evolved UMTS) which employs the E-UTRA. The LTE-Advanced (LTE-A) is an evolved version of the 3GPP LTE.

The following embodiments focus on the 3GPP system to which the technical features of the present invention are applied, but the present invention is not limited thereto.

In the present specification, transmit power may be represented by a linear scale or a dB scale. The operation according to the embodiment of the present invention may be performed in a power domain or an amplitude domain.

In the present specification, power back-off refers to an operation for reducing maximum transmit power of a User Equipment (UE) and a power back-off value refers to a maximum transmit power reduction amount of the UE.

Figure 1:
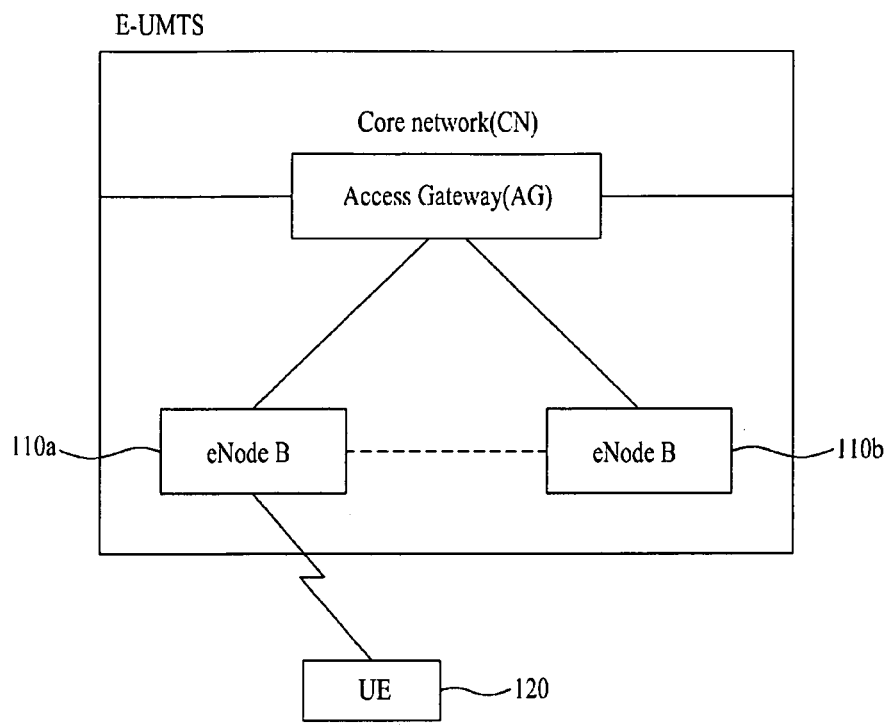
FIG. 1 is a diagram showing a network architecture of an Evolved Universal Mobile Telecommunications System (E-UMTS).

FIG. 1 is a diagram showing a network architecture of an E-UMTS. The E-UMTS is also referred to as a Long Term Evolution (LTE) system. For details of the technical specifications of the UMTS and the E-UMTS, refer to Release 7 and Release 8 of "3rd Generation Partnership Project; Technical Specification Group Radio Access Network", respectively.

Referring to FIG. 1, the E-UMTS mainly includes a User Equipment (UE) 120, base stations (BSs) (or eNBs or eNode Bs) 110a and 110b, and an Access Gateway (AG) which is located at an end of a network (E-UTRAN) and which is connected to an external network. Generally, the BS can simultaneously transmit multiple data streams for a broadcast service, a multicast service and/or a unicast service. One or more cells may exist for one BS. The cell may be set to provide any one of bandwidths of 1.25, 2.5, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of the data to be transmitted, or the like. The BS transmits uplink scheduling information to a UE with respect to uplink (UL) data so as to inform the UE of time/frequency domain, coding, data size, HARQ associated information used by the UE, or the like. A Core Network (CN) may include the AG and a network node or the like for user registration of the UE. The AG manages mobility of a UE on a Tracking Area (TA) basis. One TA includes a plurality of cells.

FIG. 2 is a diagram illustrating physical channels used in an LTE system and a general signal transmission method using the same.

Referring to FIG. 2, if a UE is powered on or newly enters a cell, the UE performs an initial cell search operation such as synchronization with a BS (S201). The UE receives a primary synchronization channel (P-SCH) and a secondary synchronization channel (S-SCH) from the BS so as to synchronize with the BS and to acquire information such as a cell ID. Thereafter, the UE may receive a physical broadcast channel from the BS so as to acquire a broadcast signal in the cell. The UE may receive a downlink reference signal (DL RS) so as to check a downlink channel state in the initial cell search step.

The UE, upon completion of initial cell search, may receive a Physical Downlink Control Channel (PDCCH) and a Physical Downlink Shared Channel (PDSCH) according to information carried in the PDCCH so as to acquire more detailed system information (S202).

When the UE initially accesses the BS or when radio resources for signal transmission are not present, the UE may perform a Random Access Channel (RACH) procedure with respect to the BS (steps S203 to S206). The UE may transmit a specific sequence using a preamble through a Physical Random Access Channel (PRACH) (S203 and S205) and receive a response message of the preamble through the PDCCH and the PDSCH corresponding thereto (S204 and S206). In the contention-based RACH, a contention resolution procedure may be additionally performed.

The UE which performs the above-described procedure may receive the PDCCH/PDSCH (S207) and transmit a Physical Uplink Shared Channel (PUSCH)/Physical Uplink Control Channel (PUCCH) (S208), as a general uplink/downlink signal transmission procedure. The information transmitted from the UE to the BS in uplink and transmitted from the BS to the UE may include a downlink/uplink ACK/NACK signal, a Channel Quality Indicator (CQI), a Precoding Matrix Index (PMI), a Rank Indicator (RI), etc. In the 3GPP LTE system, the UE may transmit the above-described information such as CQI/PMI/RI through the PUSCH and/or the PUCCH.

FIG. 3 is a diagram showing the structure of a radio frame used in the LTE system.

Referring to FIG. 3, the radio frame has a length of 10 ms ($327200*T_s$) and includes 10 subframes with the same size. Each of the subframes has a length of 1 ms and includes two slots. Each of the slots has a length of 0.5 ms ($15360*T_s$). $T_s$ denotes a sampling time, and is represented by $T_s=1/(151 cHz*2048)=3.2552*10^{-8}$ (about 33 ns). Each slot includes a plurality of OFDMA or SC-FDMA symbols in a time domain, and includes a plurality of resource blocks (RBs) in a frequency domain. In the LTE system, one RB includes 12 subcarriers*7(6) OFDM or SC-FDMA symbols. The LTE system employs OFDMA in downlink and SC-FDMA in uplink. The structure of the radio frame is only exemplary and the number of subframes included in the radio frame, the number of slots, or the number of OFDM or SC-FDMA symbols may be variously changed.

Figure 4:
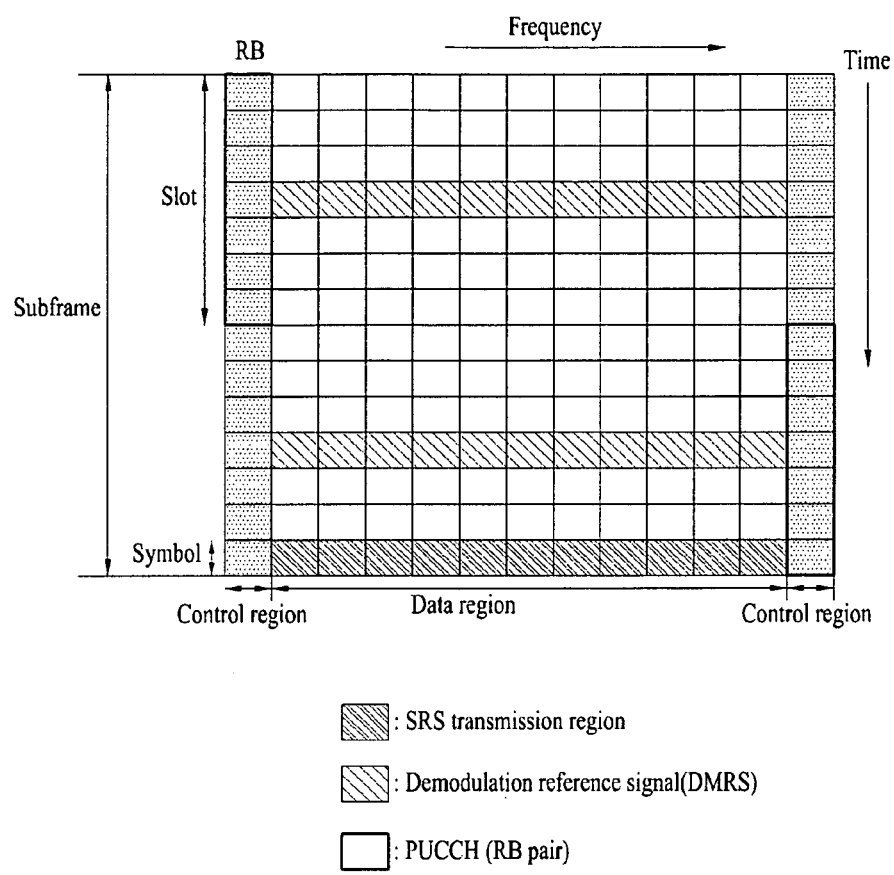
FIG. 4 is a diagram showing the structure of an uplink subframe used in the LTE system.

FIG. 4 is a diagram showing the structure of an uplink subframe used in the LTE system.

Referring to FIG. 4, the uplink subframe includes a plurality (e.g., 2) of slots. The slot may include different numbers of SC-FDMA symbols according to the length of the CP. For example, in case of a normal CP, the slot may include seven SC-FDMA symbols. The uplink subframe is divided into a data region and a control region. The data region includes a PUSCH and is used to transmit a data signal such as a voice signal or a video signal. The control region includes a PUCCH and is used to transmit a variety of control information. The PUCCH includes RB pairs located at both ends of the data region on a frequency axis and hops between slots. A Sound Reference Signal (SRS) for uplink channel measurement is located on the last SC-FDMA symbol of a subframe and is transmitted through an entire band or a partial band of the data region. The uplink transmission of the LTE system is characterized in that the PUSCH, the PUCCH and the SRS are not allowed to be simultaneously transmitted as single carrier characteristics using the SC-FDMA.

Hereinafter, a method for controlling transmit power of a UE in the legacy LTE will be described.

The maximum transmit power of the UE is determined according to a power class to which the UE belongs. Table 1 shows the power class of the UE defined in the UMTS, and Table 2 shows the power class of the UE defined in the LTE.

TABLE 1

| Operating Band | Power Class 1 | | Power Class 2 | | Power Class 3 | | Power Class 3bis | | Power Class 4 | |
|---|---|---|---|---|---|---|---|---|---|---|
| | Power (dBm) | Tolerance (dB) | Power (dBm) | Tolerance (dB) | Power (dBm) | Tolerance (dB) | Power (dBm) | Tolerance (dB) | Power (dBm) | Tolerance (dB) |
| Band I | +33 | +1/−3 | +27 | +1/−3 | +24 | +1/−3 | — | — | +21 | +2/−2 |
| Band II | — | — | — | — | +24 | +1/−3 | — | — | +21 | +2/−2 |
| Band III | — | — | — | — | +24 | +1/−3 | — | — | +21 | +2/−2 |
| Band IV | — | — | — | — | +24 | +1/−3 | — | — | +21 | +2/−2 |
| Band V | — | — | — | — | +24 | +1/−3 | — | — | +21 | +2/−2 |
| Band VI | — | — | — | — | +24 | +1/−3 | — | — | +21 | +2/−2 |
| Band VII | — | — | — | — | +24 | +1/−3 | 23 | +2/−2 | +21 | +2/−2 |
| Band VIII | — | — | — | — | +24 | +1/−3 | +23 | +2/−2 | +21 | +2/−2 |
| Band IX | — | — | — | — | +24 | +1/−3 | — | — | +21 | +2/−2 |
| Band X | — | — | — | — | +24 | +1/−3 | — | — | +21 | +2/−2 |
| Band XI | — | — | — | — | +24 | +1/−3 | — | — | +21 | +2/−2 |

TABLE 2

| EUTRA band | Class 1 (dBm) | Tolerance (dB) | Class 2 (dBm) | Tolerance (dB) | Class 3 (dBm) | Tolerance (dB) | Class 4 (dBm) | Tolerance (dB) |
|---|---|---|---|---|---|---|---|---|
| 1 | | | | | 23 | ±2 | | |
| 2 | | | | | 23 | ±2 | | |
| 3 | | | | | 23 | ±2 | | |
| 4 | | | | | 23 | ±2 | | |
| 5 | | | | | 23 | ±2 | | |
| 6 | | | | | 23 | ±2 | | |
| 7 | | | | | 23 | ±2 | | |
| 8 | | | | | 23 | ±2 | | |
| 9 | | | | | 23 | ±2 | | |
| 10 | | | | | 23 | ±2 | | |
| 11 | | | | | 23 | ±2 | | |
| 12 | | | | | 23 | ±2 | | |
| 13 | | | | | 23 | ±2 | | |
| 14 | | | | | 23 | ±2 | | |
| ... | | | | | | | | |
| 33 | | | | | 23 | ±2 | | |
| 34 | | | | | 23 | ±2 | | |
| 35 | | | | | 23 | ±2 | | |
| 36 | | | | | 23 | ±2 | | |
| 37 | | | | | 23 | ±2 | | |
| 38 | | | | | 23 | ±2 | | |
| 39 | | | | | 23 | ±2 | | |
| 40 | | | | | 23 | ±2 | | |

In the legacy LTE system, reduction of the maximum transmit power corresponding to the power class of the UE is additionally allowed according to a modulation order of a baseband stage upon transmission, an RB size, and the type of the operating band to which the UE belongs. The additional power reduction is controlled using Maximum Power Reduction (MPR) and Additional MPR (A-MPR). If data to be transmitted is within ±4 MHz of the operating band, power reduction of 1.5 dB is additionally allowed for band edge relaxation. The MPR is allowed regardless of the frequency band, in order to reduce transmit power by 1 dB or 2 dB according to the modulation order of the UE.

Table 3 shows an MPR value which is defined with respect to the UE of Power Class 3 in the LTE.

TABLE 3

| Modulation | Channel bandwidth/Transmission bandwidth configuration (RB) | | | | | | MPR (dB) |
|---|---|---|---|---|---|---|---|
| | 1.4 MHz | 3.0 MHz | 5 MHz | 10 MHz | 15 MHz | 20 MHz | |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

The A-MPR is the additional power reduction added to the A-MPR and is determined according to the 3GPP band or regional characteristics. In detail, the A-MPR of a band is determined based on the type of Network Signaling (NS) included in System Information Block 2 (SIB2) broadcast in the cell. That is, if it is determined that adjacent frequency bands needs to be guarded from the frequency band registered by the UE in the network, the network may additionally restrict the maximum transmit power through the NS so as to prevent power from leaking to adjacent bands.

Figure 5:
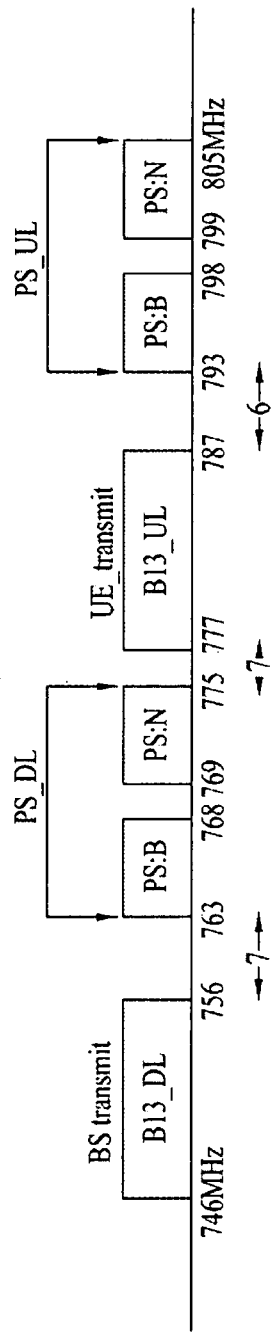
FIG. 5 is a diagram showing a frequency band and a Public Safety (PS) band of Band 13.

FIG. 5 is a diagram showing an example of using a frequency if Band 13 defined in an LTE system is used in the United States of America. Here, Band 13 refers to a frequency band having a downlink bandwidth (B13_DL) of 746 to 756 MHz and an uplink bandwidth (B13_UL) of 777 to 787 MHz. The LTE treats the A-MPR for NS_07 of Band 13 in detail, because a PS band to be strictly guarded is present on the left of an uplink bandwidth of 2 MHz, which is used for transmission of the UE, and spurious emission limit for the power leaked in Band 13 is very strict.

Table 4 shows the A-MPR value and Table 5 shows the A-MPR according to NS_07.

TABLE 4

| Network Signalling value | Requirements (sub-clause) | E-UTRA Band | Channel bandwidth (MHz) | Resources Blocks | A-MPR (dB) |
|---|---|---|---|---|---|
| NS_01 | NA | NA | NA | NA | NA |
| NS_03 | 6.6.2.2.1 | 2, 4, 10, 35, 36 | 3 | >5 | ≤1 |
| | 6.6.2.2.1 | 2, 4, 10, 35, 36 | 5 | >6 | ≤1 |
| | 6.6.2.2.1 | 2, 4, 10, 35, 36 | 10 | >6 | ≤1 |
| | 6.6.2.2.1 | 2, 4, 10, 35, 36 | 15 | >8 | ≤1 |
| | 6.6.2.2.1 | 2, 4, 10, 35, 36 | 20 | >10 | ≤1 |
| NS_04 | 6.6.2.2.2 | TBD | TBD | TBD | TBD |
| NS_05 | 6.3.3.3.1 | 1 | 10, 15, 20 | ≥50 for QPSK | ≤1 |
| NS_06 | 6.6.2.2.3 | 12, 13, 14, 17 | 1.4, 3, 5, 10 | n/a | n/a |
| NS_07 | 6.6.2.2.3 6.6.3.3.2 | 13 | 10 | Table 5 | Table 5 |
| NS_08 | 6.6.3.3.3 | 19 | 10, 15 | >29 >39 >44 | ≤1 ≤2 ≤3 |
| NS_09 | 6.6.3.3.4 | 21 | TBD | TBD | TBD |
| ... | | | | | |
| NS_32 | — | — | — | — | — |

TABLE 5

| | Region A | Region B | Region C |
|---|---|---|---|
| RB_start | 0-12 | 13-18 | 19-42 | 43-49 |
| L_CRB [RBs] | 6-8 | 1 to 5 and 9-50 | ≥8 | ≥18 | ≤2 |
| A-MPR [dB] | ≤8 | ≤12 | ≤12 | ≤6 | ≤3 |

Note
1 RB_start indicates the lowest RB index of transmitted resource blocks
2 L_CRB is the length of a contiguous resource block allocation
3 For intra-subframe frequency hopping between two regions, notes 1 and 2 apply on a per slot basis.
4 For intra-subframe frequency hopping between two regions, the larger A-MPR value of the two regions may be applied for both slots in the subframe.

Referring to Table 5, in case of the A-MPR according to NS_07, a bandwidth of 10 MHz (50 RB) is divided into three regions (regions A, B and C), and the A-MPR value is determined according to an RB start location RB_start and a bandwidth L_CRB of RB units in each region. The MPR is applied without higher signaling and can be interpreted as additional tolerance allowed to a UE vendor. In contrast, the A-MPR is a value configured from network signaling which is considered upon the setting of the transmit power of the UE, in order to guard the adjacent frequency band from the leakage power.

The maximum transmit power of the UE is determined in consideration of the MPR, the A-MPR and P-max included in an Information Element (IE) of SIB1 transmitted from the network. In the legacy LTE, the maximum transmit power of the UE may be determined using Equation 1.

$$P_{CMAX\_L} - T(P_{CMAX\_L}) \leq P_{CMAX} \leq P_{CMAX\_H} + T(P_{CMAX\_H})$$ Equation 1 where, $P_{CMAX\_L} = \text{MIN}\{P_{EMAX\_H} - \Delta T_C, P_{PowerClass} - \text{MPR} - \text{A-MPR} - \Delta T_C\}$ $$P_{CMAX\_H} = \text{MIN}\{P_{EMAX\_H}, P_{PowerClass}\}$$

$T(P_{CMAX})$ denotes a tolerance value of $P_{CMAX}$ and is applied to $P_{CMAX\_L}$ and $P_{CMAX\_H}$. Table 6 shows $T(P_{CMAX})$. MIN{A, B} denotes the smaller value of A and B.

$P_{EMAX\_H}$ denotes a value signaled by the BS and may be, for example, given through IE P-max.

$P_{PowerClass}$ denotes the maximum transmit power of the UE given according to the class of the UE, may be, for example, given by Table 1 or 2, and is 23 dBm in the LTE power class 3.

$\Delta T_C$ denotes a value given according to the location of a transmission band and may be, for example, 0 dB or 1.5 dB.

TABLE 6

| $P_{CMAX}$ (dBm) | Tolerance T ($P_{CMAX}$) (dB) |
|---|---|
| 21 ≤ $P_{CMAX}$ ≤ 23 | 2.0 |
| 20 ≤ $P_{CMAX}$ < 21 | 2.5 |
| 19 ≤ $P_{CMAX}$ < 20 | 3.5 |
| 18 ≤ $P_{CMAX}$ < 19 | 4.0 |
| 13 ≤ $P_{CMAX}$ < 18 | 5.0 |
| 8 ≤ $P_{CMAX}$ < 13 | 6.0 |
| −40 ≤ $P_{CMAX}$ < 8 | 7.0 |

$P_{UMAX}$ denotes the maximum power of the UE when power is reduced in consideration of a modulation type, a network signaling value, and a location within the band, and is identical to $P_{CMAX}$ if IE P-max is not signaled.

Hereinafter, for example, a method of setting the maximum transmit power value will be described.

Example 1

Case Where the Maximum Transmit Power is Not Reduced or Limited (Table 7)

TABLE 7

| $P_{EMAX\_H}$ | $P_{PowerClass}$ | MPR | A-MPR |
|---|---|---|---|
| — | 23 dBm | 0 dB | 0 dB |

In this case, $P_{CMAX\_L}$ and $P_{CMAX\_H}$ values are as follows.

$P_{CMAX\_L}$=MIN{−,+23 dBm}=+23 dBm=>$T$(+23 dBm)=2 dB $P_{CMAX\_H}$=MIN{−,+23 dBm}=+23 dBm=>$T$(+23 dBm)=2 dB

Accordingly, the maximum transmit power range of the UE is as follows.

$P_{CMAX\_L} - T(P_{CMAX\_L}) \leq P_{CMAX} \leq P_{CMAX\_H} + T(P_{CMAX\_H})$

+23 dBm−2 dB≤$P_{CMAX}$≤+23 dBm+2 dB

Example 2

Case Where the Maximum Transmit Power Reduction is Transmitted Through IE P-max (Case Where the Reduction of the Transmit Power of the UE is Mandatory Such as in Hospitals, etc.) (Table 8)

P-max value transmitted from the network is set to 0 dBm
Modulation scheme is 16 QAM, MPR=2 dB (a PUSCH RB size of 20 RBs is assumed)
A-MPR is not present
Power Class 3

TABLE 8

| $P_{EMAX\_H}$ | $P_{PowerClass}$ | MPR | A-MPR |
|---|---|---|---|
| 0 dBm | 23 dBm | 2 dB | 0 dB |

In this case, $P_{CMAX\_L}$ and $P_{CMAX\_H}$ values are as follows.

$P_{CMAX\_L}$=MIN{0 dBm,+21 dBm}=0 dBm=>$T$(+0 dBm)=7 dB $P_{CMAX\_H}$=MIN{0 dBm,+23 dBm}=0 dBm=>$T$(+0 dBm)=7 dB

Accordingly, the maximum transmit power range of the UE is as follows.

$P_{CMAX\_L} T(P_{CMAX\_L}) \leq P_{CMAX} \leq P_{CMAX\_H} T(P_{CMAX\_H})$ 0 dBm−7 dB≤$P_{CMAX}$≤0 dBm+7 dB Example 3

Case Where NS_07 is Signaled to the UE in Band 13 (Table 9)

P-max is not transmitted from the network
Modulation scheme is 16 QAM, MPR=1 dB (a PUSCH RB size of 12 RBs is assumed)
Channel width: 10 MHz in Band 13
L_CRB=12 RBs, RB_start=13, NS_07 is signaled through IE AdditionalSpectrumEmission (in this case, A-MPR=12 dB)

TABLE 9

| $P_{EMAX\_H}$ | $P_{PowerClass}$ | MPR | A-MPR |
|---|---|---|---|
| — | 23 dBm | 1 dB | 12 dB |

In this case, $P_{CMAX\_L}$ and $P_{CMAX\_H}$ values are as follows.

$P_{CMAX\_L}$=MIN{−,+10 dBm}=10 dBm=>$T$(+10 dBm)=6 dB $P_{CMAX\_H}$=MIN{−,+23 dBm}=23 dBm=>$T$(+23 dBm)=2 dB

Accordingly, the maximum transmit power range of the UE is as follows.

$P_{CMAX\_L} T(P_{CMAX\_L}) \leq P_{CMAX} \leq P_{CMAX\_H} + T(P_{CMAX\_H})$

+10 dBm−6 dB≤$P_{CMAX}$≤+23 dBm+2 dB

Figure 6:
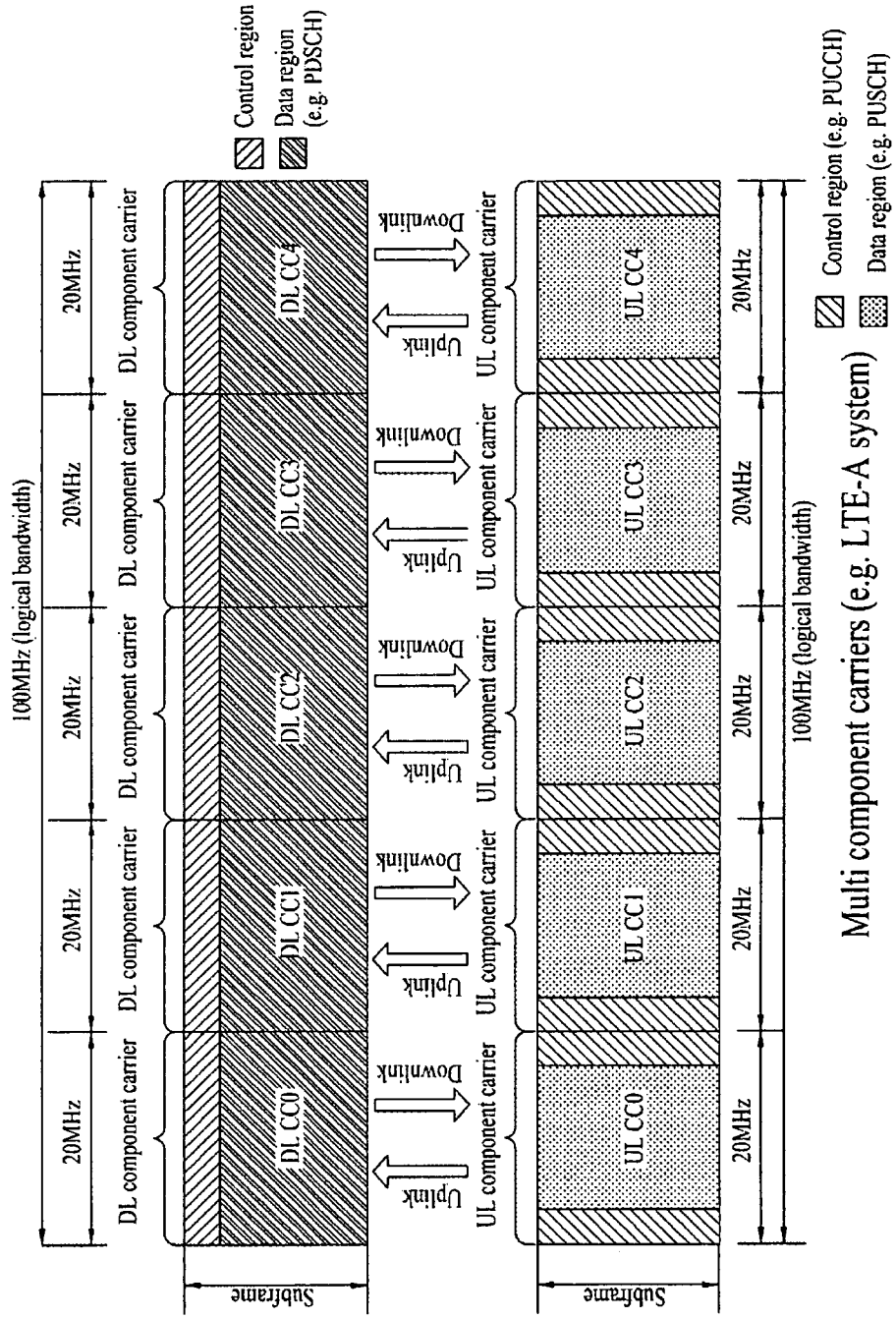
FIG. 6 is a diagram showing an example of performing communication using multiple component carriers.

FIG. 6 is a diagram showing an example of performing communication using multiple component carriers. Recent radio communication systems (e.g., LTE-A) use carrier aggregation or bandwidth aggregation technology of utilizing a plurality of uplink/downlink frequency blocks with a wider uplink/downlink bandwidth in order to use a wider frequency band. Each frequency block is transmitted using a Component Carrier (CC). In the present specification, the CC may be a frequency block or a central carrier of a frequency block for carrier aggregation according to context and the frequency block for carrier aggregation and the central carrier of the frequency block may be used together.

Referring to FIG. 6, five 20-MHz CCs may be aggregated so as to support of a bandwidth of 100 MHz in uplink/downlink. CCs may be contiguous or non-contiguous in a frequency domain. FIG. 6 shows the case where the bandwidth of an uplink CC and the bandwidth of a downlink CC are equal and symmetrical, for convenience. However, the bandwidths of the CCS may be independently set. For example, the bandwidth of the uplink CC may be 5 MHz ($A_{UL}$)+20 MHz ($B_{UL}$)+20 MHz ($C_{UL}$)+20 MHz ($D_{UL}$)+5 MHz ($E_{UL}$). In addition, asymmetrical carrier aggregation in which the number of uplink CCs and the number of downlink CCs are different is possible. Asymmetrical carrier aggregation may occur when available frequency bands are limited or may be artificially generated by network configuration. For example, although the entire band of the system includes N CCs, a frequency band in which a specific UE performs transmission or reception may be limited to M (<N) CCs.

In the LTE-A system, in order to increase spectral efficiency within a cell, a method such as PUCCH/PUCCH or PUCCH/PUSCH simultaneous transmission or clustered SC-FDMA which allows discontinuous RB allocation on a frequency band upon PUSCH transmission has been discussed. The CA shown in FIG. 6 has been discussed as a method for increasing transfer rate within a cell. However, if signals are simultaneously transmitted at different frequency locations of a band using one PA as in the PUCCH/PUCCH simultaneous transmission or the clustered SC-FDMA, these signals generate inter modulation (IMD) which is unwanted emission, while passing through a non-linear region of the PA. The IMD may be generated in a contiguous domain violating a Spectral Emission Mask (SEM) or may be located in a spurious domain which is a farther domain violating a spurious emission requirement, according to a frequency distance between the two signals.

Figure 7:
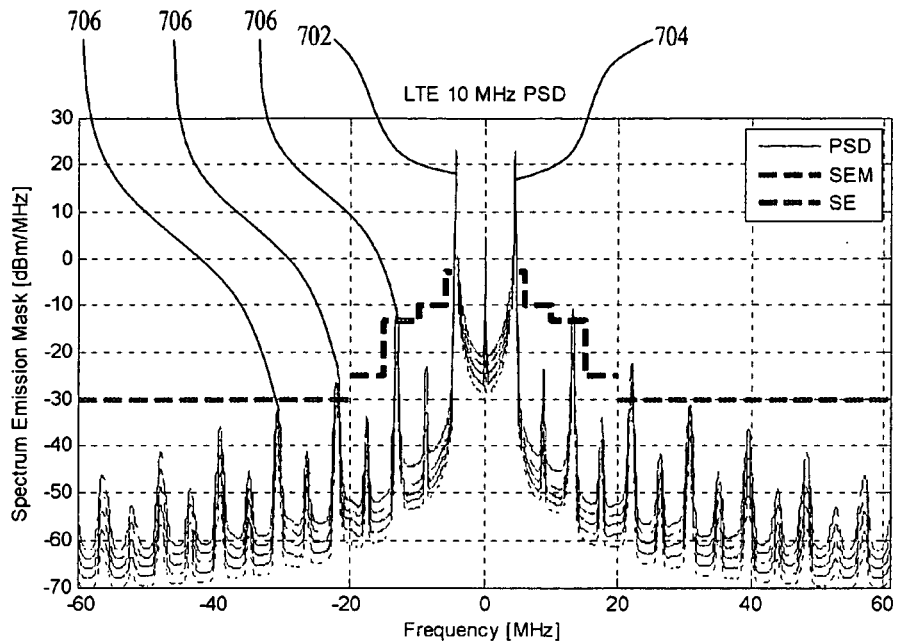
FIG. 7 is a diagram showing an example of violating a Spectral Emission Mask (SEM) and a Spurious Emission (SE) mask due to Inter-MoDulation (IMD).

FIG. 7 shows IMD generated when two signals are transmitted through both ends of a band. The two signals may be PUCCH/PUCCH, PUCCH/PUSCH, or PUSCH/PUSCH. In FIG. 7, a bandwidth of 10 MHz (−5 MHz to 5 MHz) is assumed. As shown in FIG. 7, if two signals (e.g., PUCCH/PUCCH) 702 and 704 are transmitted through both ends of the band in a state in which the maximum transmit power of the UE is 23 dBm, the LTE SEM and/or SE are violated due to IMD 706. Accordingly, in order to satisfy the SEM and SE, predetermined maximum transmit power reduction is necessary from the viewpoint of Power Spectrum Density (PSD). If the locations of two PUCCHs are close to each other, the IMD component is not an outband component but an inband component. Accordingly, inband emission correction is required. Accordingly, inband emission requirement correction cannot be avoided. Such a phenomenon may equally occur not only in PUSCH/PUCCH simultaneous transmission but also in PUCCH/PUCCH simultaneous transmission or in an intra-band contiguous/non-contiguous CA using one PA. However, in the CA, when the maximum transmit power reduction problem due to the IMD component is discussed, since a distance between two frequency components passing through the PA is greater than that of the case of using one CC, a frequency region to be considered may be increased.

As a result, if two signals are simultaneously transmitted over different bands (e.g., PUCCH/PUCCH or PUCCH/PUSCH simultaneous transmission, clustered SC-FDMA, intra-band contiguous/non-contiguous CA, etc.), the IMD component generated while passing through one PA requires reduction of the transmit signal power of the UE. Accordingly, the setting of the maximum transmit power of a UE (e.g., an LTE-A UE) which can simultaneously transmit two or more signals requires additional power reduction, compared with the setting of the maximum transmit power of the legacy LTE terminal.

Figure 8:
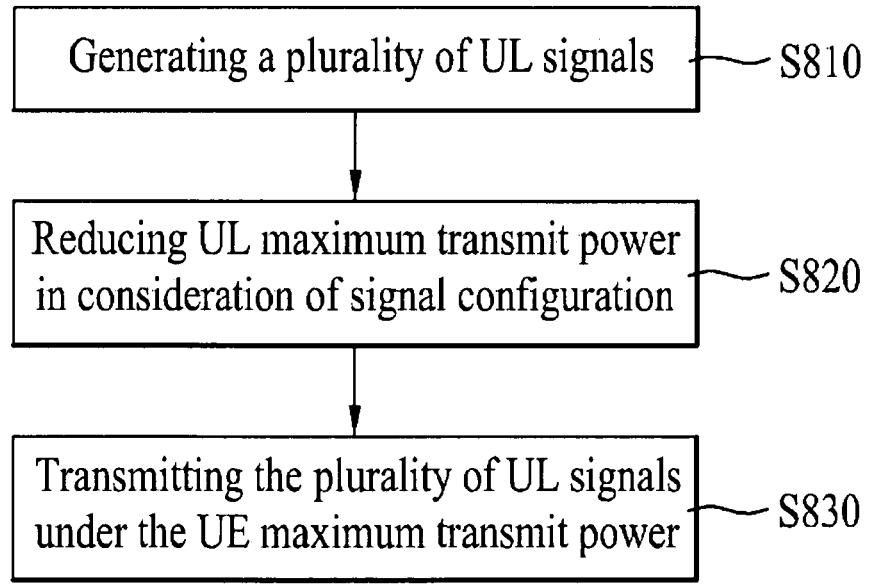
FIG. 8 is a diagram showing an example of controlling the maximum transmit power of a User Equipment (UE) according to an embodiment of the present invention.

FIG. 8 is a diagram showing a method for controlling the maximum transmit power of a UE according to an embodiment of the present invention.

Referring to FIG. 8, the UE generates a plurality of uplink (UL) signals (or channels) (S810). The plurality of UL signals includes a plurality of PUSCHs, a plurality of PUCCHs, or a combination of PUSCHs and PUCCHs. The plurality of UL signals includes PUSCH signals which are transmitted in a state of being divided into two or more clusters. That is, in the present specification, the plurality of UL signals refers to signals which are transmitted at the same time but are transmitted so as to be separated from each other in a frequency domain. The plurality of UL signals may be transmitted through identical CCs or different CCs. The plurality of UL signals may be transmitted through the same PA. Thereafter, the UE reduces the UL maximum transmit power of the UE in consideration of signal configuration (S820). The signal configuration includes at least one of a modulation scheme, a modulation order, an operating band (e.g., Band 13, etc.), a signal (channel) band (e.g., an RB size), a signal location (e.g., an RB start location) in a frequency domain, a transmit power ratio of signals, a frequency distance between signals (e.g., subcarrier, RB, RB block units) and preferably includes a power ratio of signals and a frequency distance between signals. The method of reducing the UL maximum transmit power of the UE in consideration of the signal configuration will be described in detail later with reference to FIGS. 9 and 10. Thereafter, the UE transmits the plurality of UL signals generated in step S810 to a BS/relay node within the UL maximum transmit power range of the UE, which is determined in step S820.

The element for determining the maximum transmit power of the UE may be largely divided into MPR, A-MPR and P-max, as described above. A value which is directly signaled from a network is the P-max included in a Broadcast Channel (BCH) and is determined by a BS in advance. Since the content of the BCH changes very infrequently, for example, once per day, it is difficult to dynamically change the P-max value in a short period. The MPR is dynamically determined according to a baseband transmission modulation scheme of the UE and the A-MPR is determined by mapping network signaling NS_XX to a table (e.g., Table 4 or 5).

Accordingly, the maximum transmit power of the UE may be additionally reduced using the MPR and/or A-MPR. In this case, in consideration of backward compatibility with the legacy LTE UE, the maximum transmit power of the UE is fundamentally set by applying the existing MPR/A-MPR table. However, with respect to UEs subsequent to the LTE-A UE, new maximum transmit power may be set using a new MPR/A-MPR table.

Hereinafter, various methods of setting the maximum transmit power of the UE using the MPR and/or A-MPR will be described. In detail, a new MPR/A-MPR table is different from the existing table in terms of a distance between two frequencies according to an RB location/size and an MPR/A-MPR value according to a transmit power ratio.

1. MPR Table Update

The present method relates to a method of spontaneously setting a necessary PA back-off value by a UE according to the configuration of a transmitted signal without receiving a signal from a network. For example, the UE may receive the PA back-off value depending on whether or not PUCCH simultaneous transmission is performed or according to a PUSCH allocation pattern, after receiving UL resource scheduling information (e.g., UL grant) through a DL PDCCH. As another example, two or more PUSCHs may be allocated to one band in the clustered SC-FDMA. This is identical to transmission of PUSCH data through a plurality of carriers, and the PA back-off value may be differently defined according to an allocation pattern of a frequency of the PUSCH data. As another example, PUSCH or PUCCH data may be carried in two carriers. Since the PUCCH is located on an end of a data region in a frequency domain and the location of the PUSCH changes within the data region, the PA back-off may be determined according to a distance between the frequencies of the PUCCH and PUSCH. Accordingly, a new MPR table must include a distance (e.g., RB units) on the frequency among a plurality of signals (channels). In this case, in order to simplify the new MPR table, only a frequency distance (that is, a maximum frequency distance) which has an adverse influence when a plurality of signals is simultaneously transmitted may be included in the new MPR table.

Since the MPR table is not related to a band, the MPR table according to the present embodiment may be applied regardless of region. The MPR table according to the present embodiment is not applicable to an outband requirement (requirement of Band13 of FIG. 5) which is changed according to the region. This problem may be solved using the following A-MPR table update method.

Hereinafter, a method of updating the MPR table will be described in detail.

1-A. PUCCH/PUCCH Simultaneous Transmission

The MPR value may be calculated in advance in consideration of a distance (actual or maximum distance) between the frequencies of PUCCHs and a modulation order (or scheme) (e.g., QPSK) applied to the PUCCHs. Since the PUCCHs are transmitted through a single RB, the maximum distance between the frequencies of the PUCCHs in a bandwidth may be virtually fixed to $N_{RB}-2$. $N_{RB}$ denotes the total number of RBs within a (CC) band. In the present example, it is assumed that the PUCCHs are transmitted using the same power.

1-B. PUCCH/PUSCH Simultaneous Transmission

Since the RB size of the PUSCH is variable, a distance between the frequencies of the PUCCH and the PUSCH is inversely proportional to the RB size of the PUSCH. For example, it is assumed that the PUSCH is located on an opposite side of the PUCCH on a transmission band and the RB size of the PUSCH is set to L_CRB, a distance between the PUCCH and the PUSCH is set to $N_{RB}-1-L\_CRB$ (RB units). Therefore, the MPR value of the UE may be set in advance. $N_{RB}$ denotes the number of RBs included in a frequency band and L_CRB denotes the size of the RBs consecutively allocated to the PUSCH. When all cases are considered upon PUCCH/PUSCH simultaneous transmission, complexity is increased. Therefore, the MPR may be newly defied only with respect to several representative cases where the IMD component escapes from the SEM. In case of PUCCH/PUSCH simultaneous transmission, a power ratio of PUCCH to PUSCH is problematic. Accordingly, it is possible to define a necessary MPR in advance in consideration of the power ratio of the PUCCH to the PUSCH.

1-C. Clustered SC-FDMA

There is a need for an MPR table corresponding to a PUSCH clustered transmission pattern. Since the PUSCHs may be transmitted in a state of being divided into two or more clusters, a more complicated pattern than in the PUCCH/PUCCH or PUCCH/PUSCH simultaneous transmission is obtained. For example, if PUSCH transmission is performed through two clusters, a distance (e.g., RB units) between frequencies of clusters may be represented by one variable. However, if PUSCH transmission is performed through three or more clusters, a frequency distance between clusters must be represented by two or more variables.

1-D. Intra-Band Contiguous CA

If CCs use the same PA, various IMD components may appear according to an allocation pattern of PUSCHs or PUCCHs and thus a PA back-off value thereof is necessary. The present case is characterized in that all cases of 1-A to 1-C are included and a frequency distance is additionally increased.

FIG. 9 shows an MPR table according to an embodiment of the present invention. In the MPR table of FIG. 9, the PUCCH/PUCCH, PUCCH/PUSCH and clustered SC-FDMA cases are represented by an RB allocation pattern. The MPR table of FIG. 9 is classified by a modulation order as in the existing MPR table and an MPR value according to a frequency distance is further present according to an embodiment of the present invention. In case of Frequency Division Duplex (FDD), since Band1 of the intra-band CA is defined as 20+20 MHz in the 3GPP Working Group (WG) 4, a maximum channel band becomes 40 MHz. Accordingly, in case of CA, the number of cases to be considered is increased compared with the case of a single CC. Hatched portions of FIG. 9 correspond to the case where a frequency distance between RBs is 0 and represent the MPR of the legacy LTE. The legacy LTE supports an uplink modulation scheme up to 16 QAM. Accordingly, if the uplink modulation scheme is 64 QAM, a row compatible with the legacy LTE is not present in the MPR table. If three or more PUSCH clusters are used, various combinations of a frequency distance between RBs are possible. If a power ratio is continuously changed, the MPR table of FIG. 9 may be additionally extended according to the power ratio.

2. A-MPR Table Update

The present method relates to additionally applying an A-MPR value represented by NS_XX received from a network by a UE. Since regulation requirement vary according to regions or bands, it is not preferable that all cases are applied as in the A-MPR. Accordingly, in the present method, a method of receiving NS_XX from the network, determining to which region or band the UE belongs, and determining how many times PA back-off is additionally performed according to an RB allocation pattern in order to satisfy the requirements is described.

For example, in case of Band 13 using 700 MHz, the legacy LTE UE receives NS__07 and applies the A-MPR value upon the setting of the maximum transmit power of the UE by referring to an RB_start value which is an allocation band start of a UL signal and the value of Length of Continuous RB (L_CRB) which is an allocation bandwidth. However, after the LTE-A, since PUCCH/PUSCH, PUCCH/PUCCH, Clustered SC-FDMA, intra-band CA (having a single PA) simultaneous transmission is performed, a PA back-off value must be determined in consideration of a more complicated RB allocation pattern than in the A-MPR table of the legacy LTE.

Hereinafter, a method of updating the A-MPR table will be described in detail.

2-A. PUCCH/PUCCH Simultaneous Transmission

The A-MPR value may be calculated in advance in consideration of a distance (actual or maximum distance) between the frequencies of PUCCHs and a modulation order (or scheme) (e.g., QPSK) applied to the PUCCHs. Since the PUCCHs are transmitted through a single RB, the maximum distance between the frequencies of the PUCCHs in a bandwidth may be virtually fixed to $N_{RB}-2$. $N_{RB}$ denotes the total number of RBs within a (CC) band. In the present example, it is assumed that the PUCCHs utilize the same transmit power.

2-B. PUCCH/PUSCH Simultaneous Transmission

Since the RB size of the PUSCH is variable, a distance between the frequencies of the PUCCH and the PUSCH is inversely proportional to the RB size of the PUSCH. For example, it is assumed that the PUSCH is located on an opposite side of the PUCCH and the RB size of the PUSCH is set to L_CRB, a distance between the PUCCH and the PUSCH is set to $N_{RB}-1-L\_CRB$ (RB unit). Therefore, the MPR value of the UE may be set in advance. $N_{RB}$ denotes the number of RBs included in a frequency band and L_CRB denotes the size of the RBs consecutively allocated to the PUSCH. When all cases are considered upon PUCCH/PUSCH simultaneous transmission, complexity is increased. Therefore, the A-MPR may be redefined with respect to several representative cases where the IMD component escapes from the SEM. In case of PUCCH/PUSCH simultaneous transmission, a power ratio of the PUCCH to the PUSCH is problematic. Accordingly, it is possible to define a necessary A-MPR in advance in consideration of the power ratio of the PUCCH to the PUSCH.

2-C. Clustered SC-FDMA

There is a need for an A-MPR table according to a PUSCH clustered transmission pattern. Since the PUSCHs may be transmitted in a state of being divided into two or more clusters, a more complicated pattern than in the PUCCH/PUCCH or PUCCH/PUSCH simultaneous transmission is obtained. For example, if PUSCH transmission is performed through two clusters, a distance (e.g., RB units) between frequencies of clusters may be represented by one variable. However, if PUSCH transmission is performed through three or more clusters, a frequency distance between clusters must be represented by two or more variables.

2-D. Intra-Band Contiguous CA

If CCs use the same PA, various IMD components may appear according to an allocation pattern of PUSCHs or PUCCHs and thus a PA back-off value thereof is necessary. The present case is characterized in that cases of 2-A to 2-C are all included and a frequency distance is additionally increased.

Figures 10, 11:
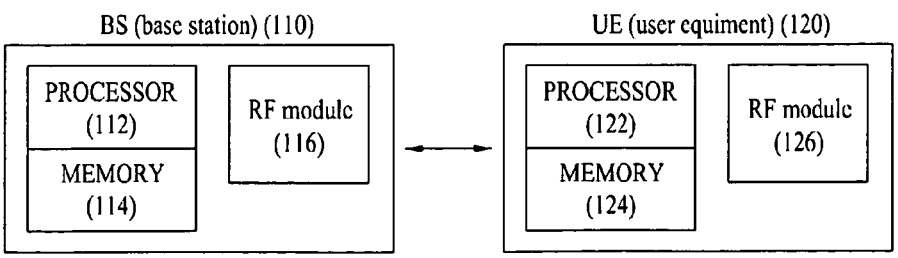
FIG. 10 is a diagram an Additional Maximum Power Reduction (A-MPR) table and a method of controlling the maximum transmit power of a UE using the same, according to an embodiment of the present invention.
FIG. 11 is a diagram showing a base station and a UE to which the embodiment of the present invention is applied.

FIG. 10 shows an A-MPR table according to an embodiment of the present invention. In FIG. 10, it is assumed that the UE receives NS__07 and a start point of RBs carried in one carrier and the length thereof are fixed. In the A-MPR table of FIG. 10, all the PUCCH/PUCCH, PUCCH/PUSCH and clustered SC-FDMA are rep-resented by an RB allocation pattern. The MPR table of FIG. 10 is classified by an RB start location (e.g., RB_start), a resource allocation size (e.g., L_CRB), and a modulation order as in the existing A-MPR table, and an A-MPR value according to a frequency distance is further present according to an embodiment of the present invention. Hatched portions of FIG. 10 correspond to the case where a distance between the frequencies of RBs is 0 and represent the MPR of the legacy LTE. If three or more PUSCH clusters are used, various combinations of a distance between the frequencies of RBs are possible. If a power ratio is continuously changed, the MPR table of FIG. 10 may be additionally extended according to the power ratio.

P-Max Value Update

P-max is used to determine the maximum transmit power and to transmit information on the maximum transmit power through an IE located in SIB1 of the PDSCH by the network. P-max is a value which is received in a state of being included in broadcast information with the same period as the period of NS_XX. If the transmit power of the UE must be lowered as in hospitals, etc., the P-max value may be reduced so as to restrict the maximum transmit power of the UE. If the PA back-off value for solving the problems of the simultaneous transmission is applied to P-max in advance, since the transmission period of P-max is different from the uplink resource allocation period of the UE, P-max must be transmitted to the UE in the format of P-max-max (PA back-off).

FIG. 11 is a diagram showing a BS and a UE to which the embodiment of the present invention is applied.

Referring to FIG. 11, a radio communication system includes a BS 110 and a UE 120. In downlink, a transmitter is a part of the BS 110 and a receiver is a part of the UE 120. In uplink, a transmitter is a part of UE 120 and a receiver is a part of the BS 110. The BS 110 includes a processor 112, a memory 114 and a Radio Frequency (RF) unit 116. The processor 112 may be configured to perform the procedures and/or methods according to the present invention. The memory 114 is connected to the processor 112 so as to store a variety of information associated with the operation of the processor 112. The RF unit 116 is connected to the processor 112 so as to transmit and/or receive a radio signal. The UE 120 includes a processor 122, a memory 124 and an RF unit 126. The processor 122 may be configured to perform the procedure and/or methods according to the present invention. The memory 124 is connected to the processor 122 so as to store a variety of information associated with the operation of the processor 122. The RF unit 126 is connected to the processor 122 so as to transmit and/or receive a radio signal. The BS 110 and/or the UE 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

INDUSTRIAL APPLICABILITY

The present invention is applicable to a radio communication system. In detail, the present invention is applicable to a method and apparatus for controlling uplink transmit power.

The invention claimed is:

1. A method for transmitting a signal by a user equipment in a radio communication system, the method comprising:
   generating a plurality of uplink signals;
   reducing a maximum transmit power of the user equipment in consideration of a signal configuration for the plurality of uplink signals; and
   transmitting the plurality of uplink signals to a network within the range of the reduced maximum transmit power of the user equipment,
   wherein the signal configuration includes a frequency distance between the plurality of uplink signals, and
   wherein, if the plurality of uplink signals includes two PUCCH signals, the frequency distance between the two PUCCH signals is set to $N_{RB}-2$ in the process of reducing the maximum transmit power of the user equipment, and $N_{RB}$ is the total number of Resource Blocks (RBs) within a band.

2. The method according to claim 1, wherein the reduction of the maximum transmit power of the user equipment is performed using Maximum Power Reduction (MPR) or Additional MPR (A-MPR) modified in consideration of the distance between the frequencies.

3. A user equipment used in a radio communication system, comprising:
   a Radio Frequency (RF) unit configured to transmit or receive an RF signal to or from a base station; and
   a processor connected to the RF signal and configured to control the RF unit,
   wherein the processor generates a plurality of uplink signals, reduces a maximum transmit power of the user equipment in consideration of a signal configuration for the plurality of uplink signals, and transmits the plurality of uplink signals to a network within the range of the reduced maximum transmit power of the user equipment,
   wherein the signal configuration includes a frequency distance between the plurality of uplink signals, and
   wherein, if the plurality of uplink signals includes two PUCCH signals, the frequency distance between the two PUCCH signals is set to $N_{RB}-2$ in the process of reducing the maximum transmit power of the user equipment, and $N_{RB}$ is the total number of Resource Blocks (RBs) within a band.

4. The user equipment according to claim 3, wherein the maximum transmit power of the user equipment is reduced using Maximum Power Reduction (MPR) or Additional MPR (A-MPR) modified in consideration of the distance between the frequencies.

* * * * *